(12) United States Patent
Böhringer et al.

(10) Patent No.: US 7,700,501 B2
(45) Date of Patent: Apr. 20, 2010

(54) ADSORPTIVE FILTERING MATERIAL HAVING BIOLOGICAL AND CHEMICAL PROTECTIVE FUNCTION AND USE THEREOF

(75) Inventors: Bertram Böhringer, Wuppertal (DE); Stefan Kämper, Hattingen (DE)

(73) Assignee: Blucher GmbH, Erkrath (DE)

( * ) Notice: Subject to any disclaimer, the term of this patent is extended or adjusted under 35 U.S.C. 154(b) by 264 days.

(21) Appl. No.: 11/595,510

(22) Filed: Nov. 10, 2006

(65) Prior Publication Data

US 2007/0181001 A1  Aug. 9, 2007

(30) Foreign Application Priority Data

Nov. 11, 2005 (DE) .................. 10 2005 054 260
Nov. 28, 2005 (DE) .................. 10 2005 056 537

(51) Int. Cl.
*A41D 13/00* (2006.01)
*B03C 3/60* (2006.01)
*B32B 27/14* (2006.01)
*B01D 53/02* (2006.01)

(52) U.S. Cl. .................. 442/123; 2/457; 96/132; 96/135; 96/153; 96/154; 128/202.19; 442/164; 442/168; 442/227; 442/237; 442/265; 442/267; 442/380

(58) Field of Classification Search .................. None
See application file for complete search history.

(56) References Cited

U.S. PATENT DOCUMENTS 5,334,436 A  8/1994  Hobbs et al. ................ 428/195

| | | | |
|---|---|---|---|
| 2003/0198945 A1 | 10/2003 | Gabbay | 435/5 |
| 2004/0237790 A1* | 12/2004 | von Blucher et al. | 96/154 |
| 2005/0035327 A1* | 2/2005 | Canada et al. | 252/182.15 |
| 2005/0048131 A1 | 3/2005 | Gabbay | 424/635 |
| 2005/0049370 A1 | 3/2005 | Gabbay | 526/122 |
| 2007/0059504 A1 | 3/2007 | Von Blucher | 428/220 |

FOREIGN PATENT DOCUMENTS

| | | |
|---|---|---|
| DE | 42 06 443 C2 | 8/1993 |
| DE | 195 19 869 A1 | 12/1996 |
| DE | 203 18 069 U1 | 5/2005 |
| EP | 893128 A2 * | 1/1999 |
| WO | WO 98/06508 A1 | 2/1998 |
| WO | WO 98/06509 A1 | 2/1998 |
| WO | WO 00/75415 A1 | 12/2000 |
| WO | WO 01/74166 A1 | 10/2001 |
| WO | WO 01/81671 A2 | 11/2001 |
| WO | WO 03/086478 A1 | 10/2003 |

* cited by examiner

*Primary Examiner*—Jennifer A Chriss
(74) *Attorney, Agent, or Firm*—Woodard, Emhardt, Moriarty, McNett & Henry LLP

(57) ABSTRACT

The invention relates to an adsorptive filtering material with biological and chemical protective function, in particular with protective function with regard to both chemical and biological poisons and noxiants, such as chemical and biological warfare agents, the adsorptive filtering material having a multilayered construction comprising a first outer supporting layer and a second outer supporting layer and an adsorptive layer disposed between the two supporting layers, the adsorptive filtering material further comprising at least one catalytically active component, the first outer supporting layer and/or the second outer supporting layer being provided with the catalytically active component. The adsorptive filtering material is particularly useful in NBC protective materials (for example NBC protective apparel) and also for production of filters.

22 Claims, 1 Drawing Sheet

ADSORPTIVE FILTERING MATERIAL HAVING BIOLOGICAL AND CHEMICAL PROTECTIVE FUNCTION AND USE THEREOF

CROSS REFERENCE TO RELATED APPLICATIONS

This application claims priority of German Patent Application No. DE 10 2005 054 260.3, filed Nov. 11, 2005, and also claims priority of German Patent Application No. DE 10 2005 056 537.9, filed Nov. 28, 2005, entitled "ADSORPTIVE FILTERING MATERIAL HAVING BIOLOGICAL AND CHEMICAL PROTECTIVE FUNCTION AND USE THEREOF". Both references are expressly incorporated by reference herein, in their entirety.

BACKGROUND OF THE INVENTION

The present invention relates to an adsorptive filtering material with biological and chemical protective function and to its use, in particular for production of protective materials of any kind and also of filters and filtering materials of any kind. The present invention further relates to the protective materials and also filters and filtering materials themselves, produced using the adsorptive filtering material of the present invention.

There are a whole series of materials which are taken up by the skin and lead to serious physical harm (noxae). Examples include the vesicatory Hd (also known as Yellow Cross and mustard gas) and the nerve agent sarin. People likely to come into contact with such poisons must wear suitable protective apparel or be protected against these poisons by suitable protective materials.

There are in principle three types of protective suits: air and water vapor impervious protective suits which are equipped with a layer of rubber which is impervious to biological and chemical poisons and very rapidly leads to a heat build-up for the wearer; air and water vapor pervious protective suits, which offer the highest wear comfort; and finally protective suits equipped with a membrane which allows water vapor to pass through it but not biological and chemical poisons. NBC protective apparel is thus traditionally produced either from impermeable systems (for example suits composed of butyl rubber or suits comprising a membrane) or permeable, air-pervious adsorptive filtering systems based in particular on activated carbon (for example pulverized coal carbon, activated carbon fiber materials or spherocarbon etc).

While air-impervious membrane-equipped suits lead to relatively good protection not only against chemical and biological poisons but also against warfare agents, permeable, air-pervious adsorptive protective suits possess a very good protective effect with regard to chemical poisons, but which often is only inadequate with regard to biological noxiants.

Permeable, adsorptive filtering systems, in particular those based on activated carbon, are therefore often endowed with a catalytically active component by impregnating the activated carbon with a biocidal or biostatic catalyst, in particular on the basis of metals or metal compounds.

Such a protective material is described for example in DE 195 19 869 A1, which contains a multiply, textile, gas-pervious filtering material comprising an adsorptive layer based on activated carbon, in particular in the form of carbonized fibers, the activated carbon being impregnated with a catalyst selected from the group consisting of copper, cadmium, platinum, palladium, mercury and zinc, in amounts of 0.05% to 12% by weight, based on the activated carbon material. The disadvantage with this protective material or filtering system is the fact that impregnation with the catalyst destroys a portion of the adsorptive capacity needed for adsorbing and thus disarming chemical noxiants. The impregnating operation thus has an adverse impact on the performance capability of the activated carbon used. Furthermore, impregnating the activated carbon material is relatively costly and often compromises the manufacturing operation for the activated carbon, in particular the activating step. Moreover, impregnation with the catalyst does not always provide the desired efficacy against biological noxiants or microorganisms. Finally, the impregnating operation requires relatively large amounts of the catalytic metal.

The present invention therefore has for its object to provide an adsorptive filtering material or protective material whereby the above-described disadvantages of the prior art are at least substantially obviated or at least ameliorated. More particularly, such an adsorptive filtering or protective material should be suitable in particular for the production of NBC protective materials of any kind, for example NBC protective apparel and the like, and also of filters and filtering materials.

The present invention further has for its object to provide a permeable, in particular gas- or air-pervious adsorptive filtering or protective material which is effective not only with regard to chemical poisons or noxiants, in particular chemical warfare agents, but also with regard to biological noxiants (for example microorganisms, such as bacteria, viruses and fungi), in particular biological warfare agents.

The problem described above is solved in the realm of the present invention by an adsorptive filtering material. Further, advantageous embodiments of the described adsorptive filtering material are also disclosed.

The present invention further provides for the use of the present invention's adsorptive filtering material for production of protective materials of any kind, in particular of protective apparel, in particular for the civil or military sector, such as protective suits, protective gloves, protective shoewear, protective socks, protective headgear and the like, and of protective covers of any kind, preferably for NBC deployment, and also the thus produced protective materials of the aforementioned kind themselves.

The present invention finally also provides for the use of the present invention's adsorptive filtering material for production of filters and filtering materials of any kind, in particular for removing noxiant, odorant and toxicant materials of any kind, in particular from air and/or gas streams, such as NBC protective mask filters, odor filters, sheet filters, air filters, in particular filters for indoor air cleaning, adsorption-capable supporting structures and filters for the medical sector, and also the thus produced filters and filtering materials of the aforementioned kind themselves.

The present invention accordingly provides in a first aspect of the present invention an adsorptive filtering material with biological and chemical protective function, in particular with protective function with regard to both chemical and biological poisons and noxiants, such as chemical and biological warfare agents, the adsorptive filtering material having a multilayered construction comprising a first outer supporting layer and a second outer supporting layer and an adsorptive layer disposed between the two supporting layers, the adsorptive filtering material further comprising at least one catalytically active component, wherein the first outer supporting layer and/or the second outer supporting layer, preferably the first outer supporting layer or the second outer supporting layer, is/are invested or provided with the catalytically active component. According to the present invention it is accordingly the case that at least one of the two outer supporting layers and preferably only one of the two outer supporting layers is invested or provided with the catalytically active component.

The fundamental idea of the present invention thus consists in endowing adsorptive filtering materials of multilayered construction with an increased or improved protective function with regard to biological noxiants, in particular biological warfare agents, by providing a catalytically active component which—in contradistinction to the prior art—is part of the supporting layer or layers.

The fact that the catalytically active component is part of the supporting layer as opposed to the adsorptive layer provides a multiplicity of advantages. First, costly and inconvenient impregnation of the adsorptive layer, in particular the activated carbon, is obviated. Consequently, the adsorptive capacity of the adsorptive layer, in particular of the activated carbon, is not impaired or reduced by the catalytically active component. Secondly, the manufacturing operation for the adsorptive layer, in particular the activated carbon manufacture, is not impaired by the presence of the catalytically active component. Thirdly, it is simpler in production engineering terms to fit the investment of the supporting layer or layers with the catalytically active component into the production line of the entire manufacturing operation for the adsorptive filtering material, since the coating with the catalytically active component takes place independently of the manufacture of the adsorptive layer, more particularly independently of the activated carbon manufacture.

Moreover, Applicants' studies have shown that, surprisingly, the protective function of the present invention's adsorptive filtering material wherein the catalytically active component is disposed not in the adsorptive layer, but in some other layer (namely according to the present invention, in the supporting layer), the protective performance is distinctly improved compared with conventional adsorptive filtering materials of the prior art wherein the adsorptive layer itself is impregnated with the catalytically active component. Applicants' tests, carried out according to the relevant prescriptions and standards, have shown that the permeated amount of chemical and biological poisons and noxiants is distinctly reduced in the case of the adsorptive filtering material according to the present invention—compared with conventional protective materials wherein the adsorptive layer is impregnated with the catalytically active component (the comparison being undertaken with comparable systems of catalyst and comparable amounts of catalyst). This is because, in the realm of the adsorptive filtering material of the present invention, the poisons and noxiants to be rendered harmless have to pass through a double barrier in the form of two distinct layers, namely, on the one hand, a layer comprising a catalytically active component which acts in particular against biological noxiants (for example microorganisms, such as bacteria, viruses or fungi and the like), but in certain circumstances also renders harmless, or alternatively may destroy, a portion of the chemical noxiants and poisons, and, on the other, an adsorptive layer for adsorption, or rendering harmless, predominantly of chemical poisons and noxiants, but if appropriate also a portion of the biological toxicants. By virtue of the fact that, in accordance with the present invention, the catalytically active component on the one hand and the adsorptive component on the other are disposed in separate layers, moreover, the residence or contact time with the poisons or noxiants to be rendered harmless is considerably increased compared with conventional adsorptive filtering materials wherein the catalytically active component is disposed in the adsorptive layer itself, so that the protective performance is increased and the number of breakthroughs is reduced. In addition, smaller amounts of catalytically active component are needed.

The protective material of the present invention thus offers effective protection not only with regard to chemical poisons and noxiants, in particular chemical warfare agents ("C weapons" such as sarin, Hd, soman etc.) but also with regard to biological poisons and noxiants ("B weapons", such as viruses, bacteria, fungi, microorganisms, etc, examples being anthrax, smallpox, Ebola, plague, Marburg virus, etc.).

The biological protective function of the adsorptive filtering material of the present invention is comparable to membrane systems, but the gas, in particular air, perviousness or permeability of the adsorptive filtering material of the present invention means that wear comfort is distinctly enhanced over membrane suits on processing into NBC protective suits. But the decisive advantage of the present invention's adsorptive filtering material over membrane systems is that biological noxiants are rendered harmless or decomposed by the adsorptive filtering material of the present invention, so that, after use of the adsorptive filtering material of the present invention, no harmful noxiants remain on the material, whereas in the case of membrane systems of the prior art—which have only one barrier function—the noxiants remain on the surface and still constitute a risk of contamination or endangerment, for example when the protective apparel is being taken off). Moreover, the adsorptive filtering material of the present invention is consequently repeatedly usable without further ado without it having to be decontaminated, since it is constructed to be self-decontaminating so to speak.

Compared with adsorptive filtering materials of the prior art wherein the activated carbon itself is impregnated with the catalytically active component, the protective function offered by the adsorptive filtering material of the present invention is distinctly enhanced—as has shown itself in particular in the lower number of breakthrough rates in the course of Applicant' measurements, and that even in the case of major quantities of challenging chemical and biological poisons and noxiants and even over a prolonged period.

Altogether, the conception of the adsorptive filtering material of the present invention is associated with a multiplicity of advantages, of which the aforementioned advantages may only be mentioned by way of example.

As previously described, the adsorptive filtering material of the present invention has a sandwich-like construction in which the adsorptive layer is so to speak disposed as a core layer between two outer supporting layers or plies.

As previously described, in principle not only the first outer supporting layer but also the second outer supporting layer may be invested/provided with the catalytically active component (i.e. at least one of the two outer layers may be invested/provided with the catalytically active component. However, it is preferable according to the present invention for only one of the two outer supporting layers to be invested/provided with the catalytically active component, and it is preferably the supporting layer which, in the use state, faces the noxiant side that is invested/provided with the catalytically active component. This ensures that, in the use state, the noxiant-containing air stream first passes through the supporting layer comprising the catalytically active component, only then the adsorptive layer and finally the second supporting layer. In the less preferred embodiment, whereby both the supporting layers are invested or provided with a catalytically active component, different catalytically active components may be provided for example for the first outer and the second outer supporting layers. However, all elucidations hereinbelow relate to both the embodiments, i.e. not only to the less preferred embodiment, whereby both the supporting layers are invested or provided with the catalytically active component, but also to the embodiment whereby only one of the two supporting layers is invested or provided with the catalytically active embodiment.

The adsorptive layer provided according to the present invention may be secured, in particular adhered (for example by discontinuous, in particular dot matrix shaped adhesive bonding), to the first outer supporting layer and/or to the second outer supporting layer. As a result, the adsorptive layer is advantageously conjoined, in particular adhered, with the first outer supporting layer and/or with the second outer supporting layer, preferably with the first outer supporting layer and with the second outer supporting layer. However, in principle it is also possible for the individual layers to be all or in part only to be arranged above each other loosely or at least essentially unconjoined.

In an embodiment preferred according to the present invention, the adsorptive layer is based on activated carbon, i.e. the adsorption-capable layer comprises or consists of activated carbon. The activated carbon may be present in the form of activated carbon particles and/or activated carbon fibers.

For example, the adsorptive layer may comprise or consist of discrete particles of activated carbon, preferably in granule form ("granulocarbon") or spherical form ("spherocarbon"). More particularly, in this case the average diameter of the activated carbon particles is <1.0 mm, preferably <0.8 mm, more preferably <0.6 mm. The average diameter of the activated carbon particles is at least 0.1 mm in particular. In this embodiment, the activated carbon particles can be used in an amount of 10 to 500 $g/m^2$, in particular 25 to 400 $g/m^2$, preferably 50 to 300 $g/m^2$, more preferably 25 to 275 $g/m^2$, even more preferably 100 to 250 $g/m^2$, most preferably 125 to 200 $g/m^2$. In particular, activated carbon particles are used that have a bursting pressure of 5 newtons, in particular at least 10 newtons and/or up to 20 newtons per individual particle of activated carbon, in particular activated carbon granule or spherule.

Alternatively, however, the adsorptive layer may also be formed of activated carbon fibers, in particular in the form of an activated carbon fabric, or comprise activated carbon fibers. This embodiment utilizes in particular activated carbon fabrics having basis weights in the range from 10 to 300 $g/m^2$, in particular in the range from 20 to 200 $g/m^2$ and preferably in the range from 30 to 150 $g/m^2$. Useful activated carbon fiber fabrics for the present invention include for example activated carbon fiber wovens, formed-loop knits, laids or composites, in particular based on carbonized and activated cellulose and/or based on carbonized and activated acrylonitrile.

It is similarly possible to combine activated carbon particles on the one hand with activated carbon fibers on the other to form the adsorptive layer.

It is preferable according to the present invention when the activated carbon (i.e. activated carbon particles or activated carbon fibers) used to form the adsorptive layer has an internal surface area (BET) of at least 800 $m^2/g$, in particular of at least 900 $m^2/g$, preferably of at least 1000 $m^2/g$ and more preferably in the range from 800 to 2500 $m^2/g$.

It may further be provided that the adsorptive filtering material of the present invention may further comprise at least one top layer, which may typically be disposed on, preferably conjoined with, that side of the first or second outer supporting layer which is remote from the adsorptive layer. Typically, the materials used for the top layer are textile fabrics, in particular wovens, knits, laids, bondeds (batts for example) or nonwovens. Typically, the top layer is disposed such that, in the use state of the adsorptive filtering material of the present invention, it faces the side of the challenging toxicant or noxiant materials, i.e. on that supporting layer which, in the use state, faces the noxiant side. Typically, the top layer is oleo- and/or hydrophobicized, preferably oleo- and hydrophobicized, in particular to achieve a certain aerosol protection and when sizable droplets of noxiant and toxicant materials land on the surface to disperse them on the surface of the absorptive filtering material of the present invention; suitable oleo- and hydrophobicizing agents for this purpose are well known to a person skilled in the art (for example fluoropolymers, such as fluorocarbon resins). The top layer may further be endowed with flame protection (a phosphoric ester for example). The top layer may also be rendered antistatic. The top layer may also be endowed with infrared (IR) reflective properties. Finally, the top layer may also be provided on its noxiant side (i.e. on the outside surface in the use state) with a camouflage print, in particular in the manufacture of NBC protective suits.

In a particularly preferred embodiment, the adsorptive filtering material of the present invention has the following construction: top layer/first outer supporting layer comprising catalytically active component/adsorptive layer/second outer supporting layer. The top layer generally faces the noxiant side in the use state of the adsorptive filtering material of the present invention. It is further possible in this embodiment for the second outer supporting layer to be likewise impregnated with a catalytically active component.

As well as the aforementioned layers, the adsorptive filtering material of the present invention may contain yet other layers, in particular textile plies. These can be disposed above, below or between the aforementioned layers.

The catalytically active component used according to the present invention comprises in particular a catalytically active component having a biostatic and/or biocidal effect, in particular a bacteriostatic or bactericidal and/or virustatic or virucidal and/or fungistatic or fungicidal effect. Typically, the catalytically active component is based on a metal or a metal compound, in particular from the group consisting of copper, silver, cadmium, platinum, palladium, rhodium, zinc, mercury, titanium, zirconium and/or aluminium and also their ions and/or salts, preferably copper and silver and also their ions and/or salts.

Preferably, according to the present invention, the catalytically active component is based on a metal or metal compound, preferably an inorganic metal compound, more preferably a metal oxide. It is similarly possible to combine various metals or metal compounds with each or one another, either in the same supporting layer or alternatively in distinct supporting layers. In an embodiment particularly preferred according to the present invention, the catalytically active component is selected from silver and/or copper, in particular in metallic form and/or in ionic, preferably oxidic form. It is very particularly preferred according to the present invention for the catalytically active component to be selected from the group consisting of Ag, $Ag_2O$, Cu, $Cu_2O$ and CuO and also mixtures thereof.

The catalytically active component used according to the present invention is selected such that it retains its catalytic activity for at least five years and preferably for at least ten years when stored under customary conditions. Furthermore, the catalytically active component should also be stable, i.e. storage stable, above 80° C. for a defined period. This prerequisite is fulfilled by the aforementioned compounds, in particular those based on silver and/or copper.

The amount used of catalytically active component can vary within wide limits. In general, the amount used of catalytically active component, based on the first and/or second outer supporting layer, is in the range from 0.001% to 20% by weight, in particular in the range from 0.005% to 10% by weight and preferably in the range from 0.01% to 5% by weight. Based on the adsorptive filtering material as a whole, the amounts of catalytically active component used are of course less. In general, the catalytically active component is used in amounts based on the adsorptive filtering material as a whole ranging from 0.0001 to 10% by weight, in particular from 0.001% to 5% by weight and preferably from 0.002% to 2% by weight. It can none the less be envisaged according to the present invention to depart from the aforementioned amounts, for a particular application or on a one-off basis, without going outside the realm of the present invention.

The first outer supporting layer may be at least essentially sheetlike or at least essentially two-dimensional. In particular, the first outer supporting layer is a textile fabric, e.g. a woven fabric, a knitted fabric, a laid fabric, a bonded fabric (a batt for example) or a nonwoven. In general, the textile fabric of the first outer supporting layer has a basis weight in the range from 10 to 150 g/m$^2$, in particular in the range from 10 to 100 g/m$^2$, preferably in the range from 15 to 75 g/m$^2$, more preferably in the range from 20 to 60 g/m$^2$ and most preferably in the range from 25 to 50 g/m$^2$. The second outer supporting layer is also generally at least essentially sheetlike or at least essentially two-dimensional. In particular, the second outer supporting layer is a textile fabric, in particular a woven fabric, a knitted fabric, a laid fabric, a bonded fabric (a batt for example) or a nonwoven, wherein the textile fabric of the second outer supporting layer generally has a basis weight in the range from 10 to 150 g/m$^2$, in particular in the range from 40 to 120 g/m$^2$ and preferably in the range from 60 to 120 g/m$^2$.

In principle, identical materials can be used to form the first and second outer supporting layers. However, it is generally preferable to use different materials, in particular textile fabrics having different basis weights and/or different fibers and/or different properties.

For example, the first and/or second outer supporting layers may be a textile fabric consisting of natural and/or manufactured fibers, preferably manufactured fibers.

It is preferable according to the present invention- for the first and/or second outer supporting layers to be a textile fabric comprising or composed of natural and/or manufactured fibers, preferably manufactured fibers, preferably from the group consisting of polyamides, polyesters, polyolefins, polyurethanes, polyvinyl (for example polyvinyl alcohols) and/or polyacrylic.

As previously described, the first and/or second outer supporting layers are constructed as a textile fabric. The catalytically active component is generally incorporated in or permanently conjoined with the supporting layer or the textile fabric of the supporting layer in question, in particular the fibers, threads, yarns, filaments or the like forming the fabric. Depending on the chemical nature of the fibers, threads, yarns, filaments or the like, the incorporation of the catalytically active component can be effected by different processes, for example by spinning, extrusion, impregnation, chemical treatment processes (for example by impregnation with subsequent oxidation/reduction), plasma-chemical treatment processes (for example sputtering) or the like. A person skilled in the art is sufficiently familiar with this from the prior art.

In principle, the first and/or second outer supporting layers, in particular the supporting layer which faces the noxiant source in the use state, may also be provided with a hydrophilic or hydrophobic finish. In general, the first and/or second outer supporting layers have a cross-sectional thickness in the range from 0.05 to 5 mm, preferably in the range from 0.1 to 1 mm and in particular in the range from 0.2 to 0.5 mm. Furthermore, the first and/or second outer supporting layers generally have a good gas or air transmission rate, in particular of at least 1000 l·m$^{-2}$·s$^{-1}$, in particular at least 2000 l·m$^{-2}$·s$^{-1}$, preferably at least 3000 l·m$^{-2}$·s$^{-1}$ and more preferably at least 3500 l·m$^{-2}$·s$^{-1}$ at a flow resistance of 127 pascals.

With regard to the durable finishing or endowment of textile fabrics with biocidal or biostatic catalytically active components and the corresponding manufacturing operation reference may be made by way of example, purely illustratively, to the following printed publications, whose disclosure in this respect is hereby incorporated herein by reference: WO 01/74166 A1 or the resulting European patent EP 1 272 037 B1 as well as WO 98/06508 A1, WO 98/06509 A1, US 2005/0049370 A1, US 2003/0198945 A1, US 2005/0048131 A1, WO 00/75415 A1, WO 01/81671 A2 and WO 03/086478 A1.

Textile fabrics useful for the purposes of the present invention and being invested or provided with a biostatic or biocidal catalytically active component and useful as outer supporting layers in the realm of the present invention are also commercially available, for example from Cupron Corporation, New York (USA), Foss Manufacturing Company Inc., Hampton, N.H. (USA) or Noble Fiber Technologies, Clarks Summit, Pa. (USA).

As previously described, the adsorptive filtering material of the present invention is gas pervious, in particular air pervious, and/or water pervious and/or water vapor pervious. This provides excellent wear comfort on processing into NBC protective suits.

In general, the adsorptive filtering material of the present invention has, at a flow resistance of 127 pascals, a gas or air transmission rate of at least 50 l·m$^{-2}$·s$^{-1}$, in particular at least 100 l·m$^{-2}$·s$^{-1}$, preferably at least 200 l·m$^{-2}$·s$^{-1}$, more preferably at least 500 l·m$^{-2}$·s$^{-1}$ and most preferably at least 600 l·m$^{-2}$·s$^{-1}$, and/or up to 10 000 l·m$^{-2}$·s$^{-1}$.

In general, the adsorptive filtering material of the present invention has an overall basis weight in the range from 150 to 1000 g/m$^2$, in particular in the range from 200 to 800 g/m$^2$, preferably in the range from 250 to 600 g/m$^2$ and more preferably in the range from 300 to 500 g/m$^2$, in particular when the overall cross-sectional thickness of the adsorptive filtering material of the present invention ranges from 0.1 to 10 mm, in particular from 0.2 to 5 mm and preferably from 0.5 to 1.0 mm.

To increase wear comfort on processing into NBC protective apparel, the adsorptive filtering material of the present invention should have a water vapor transmission rate of at least 5 l/m$^2$ per 24 h, in particular at least 10 l/m$^2$ per 24 h, preferably at least 15 l/m$^2$ per 24 h, more preferably at least 20 l/m$^2$ per 24 h and most preferably at least 25 l/m$^2$ per 24 h.

To ensure a good protective effect, the adsorptive filtering material of the present invention generally has a barrier effect with regard to chemical warfare agents, in particular bis[2-chloroethyl] sulphide (mustard gas, Hd, Yellow Cross), determined by method 2.2 of CRDEC-SP-84010, permitting permeation of not more than 4 μg/cm$^2$ per 24 h, in particular not more than 3.5 μg/cm$^2$ per 24 h, preferably not more than 3.0 μg/cm$^2$ per 24 h and more preferably not more than 2.5 μg/cm$^2$ per 24 h.

Further advantages, properties, aspects and features of the present invention will become apparent from the following description of an operative example depicted in the drawings.

BRIEF SUMMARY

Adsorptive material is disclosed with biological and chemical protective function, and adsorptive filtering material having a multilayered construction composing a first outer supporting layer and a second outer supporting layer and an adsorptive layer disposed between the two supporting layers, the adsorptive filtering material further comprising at least one catalytically active component, wherein at least one of the first and second outer supporting layers is provided with the catalytically active component.

One object of the present disclosure is to describe an improved adsorptive filtering material.

BRIEF DESCRIPTION OF THE SEVERAL VIEWS OF THWE DRAWINGS

DETAILED DESCRIPTION

Figure 1A:
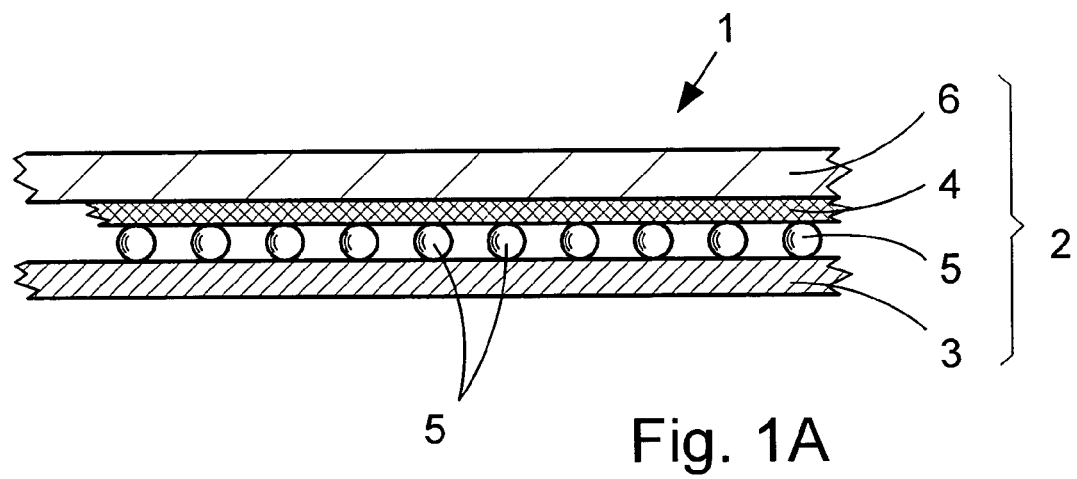
FIG. 1A shows a schematic sectional view through the layered construction of an adsorptive filtering material according to an embodiment of the present invention.

For purposes of promoting an understanding of the disclosure, reference will now be made to the embodiments illustrated in the drawing and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure related.

Figure 1B:
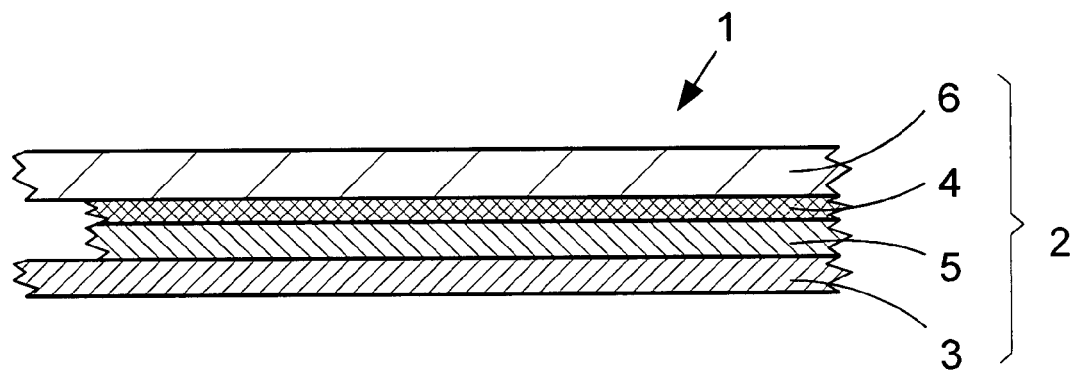
FIG. 1B shows a schematic sectional view through the layered construction of an adsorptive filtering material according to an alternative embodiment of the present invention.

FIGS. 1A and 1B show a schematic sectional view through the layered construction 2 of a present invention adsorptive filtering material 1 corresponding to a specific embodiment. The adsorptive filtering material 1 according to the present invention, that is endowed not only with biological but also with chemical protective function, in particular with protective function with regard to both chemical and biological poisons and noxiants, such as chemical and biological warfare agents, comprises a multilayered construction 2 comprising a first outer supporting layer 3 and a second outer supporting layer 4 and an adsorptive layer 5 disposed between the two supporting layers 3 and 4. The first outer supporting layer 3 and/or the second outer supporting layer 4, preferably the second outer supporting layer 4, is invested or provided with a catalytically active component (not depicted). The second outer supporting layer also has had a top layer 6 applied to it. The mechanical, physical and/or chemical properties of the aforementioned layers or plies are discussed in the above observations, which apply mutatis mutandis with regard to this specific embodiment.

While layer 3 or 4 is effective, through the catalytically active component, especially with regard to biological noxiants (for example microorganisms, such as bacteria, viruses or fungi and the like), but also capable if appropriate of catalytically rendering harmless or alternatively decomposing a portion of the chemical noxiants or poisons, the adsorptive layer 5 effects an adsorption or rendering harmless predominantly of chemical poisons or noxiants, but if appropriate also of a portion of the biological toxicants.

While FIG. 1A shows an embodiment of the present invention whereby the adsorptive layer 5 is formed of discrete particles of adsorbent, in particular of activated carbon (for example spherules of activated carbon), FIG. 1B shows an alternative embodiment of the present invention whereby the adsorptive layer 5 is formed of an adsorptive fabric, in particular an activated carbon fiber fabric.

The present invention further provides for the use of the present invention's adsorptive filtering material, as previously described, for production of protective materials of any kind, in particular of protective apparel, in particular for the civil or military sector, such as protective suits, protective gloves, protective shoewear, protective socks, protective headgear and the like, and of protective covers of any kind, all the aforementioned protective materials being preferably destined for NBC deployment.

The present invention further provides for the use of the present invention's adsorptive filtering material, as previously described, for production of filters and filtering materials of any kind, in particular for removing noxiant, odorant and toxicant materials of any kind, in particular from air and/or gas streams, such as NBC protective mask filters, odor filters, sheet filters, air filters, in particular filters for indoor air cleaning, adsorption-capable supporting structures and filters for the medical sector.

The present invention also provides the aforementioned protective materials of any kind themselves, in particular for the civil or military sector, in particular protective apparel, such as protective suits, protective gloves, protective shoewear, protective socks, protective headgear and the like, and also protective covers, produced using the present invention's adsorptive filtering material or comprising the present invention's adsorptive filtering material, all the aforementioned protective materials being preferably destined for NBC deployment.

The present invention finally also provides filters and filtering materials of any kind, in particular for removing noxiant, odorant and toxicant materials of any kind, in particular from air and/or gas streams, such as NBC protective mask filters, odor filters, sheet filters, air filters, in particular filters for indoor air cleaning, adsorption-capable supporting structures and filters for the medical sector, produced using the present invention's material or comprising the present invention's adsorptive filtering material.

For further details concerning the above-described uses according to the present invention and the above-described entities according to the present invention reference may be made to the above observations concerning the present invention's adsorptive filtering material which apply mutatis mutandis in relation to the uses according to the present invention and the entities according to the present invention.

Further refinements, modifications and variations of the present invention are readily apparent to and realizable by the ordinarily skilled on reading the description without their having to go outside the realm of the present invention.

The present invention is illustrated with reference to the following example which, however, shall not in any way restrict the present invention.

EXAMPLE

An adsorptive filtering material according to the present invention is produced. For this purpose, a first supporting layer, commercially available from Cupron Corporation, New York (USA), which has a basis weight of 25 g/m² (0.3 mm thickness) and is invested or provided with 3% by weight (i.e. 0.75 g/m²) of a copper compound, reckoned as copper, and has an air transmission rate at—a flow resistance of 127 pascals—of 4240 l·m⁻²·s⁻¹ is invested or provided with activated carbon spherules at an add-on level of 180 g/m² by adhesive bonding and the adsorptive layer is provided with a second supporting layer on the side remote from the first supporting layer. The result is a present invention adsorptive filtering material having an overall basis weight of 355 g/m² and an overall thickness (cross section) of 0.9 mm and an air transmission rate—at a flow resistance of 127 pascals—of 680 l·m⁻²·s⁻¹. The copper fraction based on the entire adsorptive filtering material is thus about 0.002% by weight, reckoned as copper. A mixture of $Cu_2O$ and $CuO$ is used as copper component.

The comparative material is an identically constructed adsorptive filtering material with the difference that the first supporting layer is not invested or not provided with a catalytically active component, but instead an activated carbon impregnated with a copper compound is used, the copper fraction, reckoned as copper, being twice as high as that of the adsorptive filtering material of the present invention, and thus about 0.004% by weight, based on the entire comparative adsorptive filtering material.

The inventive adsorptive filtering material on the one hand and the comparative adsorptive filtering material on the other are tested for their barrier effects with regard to mustard gas and soman in accordance with method 2.2 of CRDEC-SP-84010 in a convective flow test. For this purpose, an air stream containing mustard gas or soman is flowed at a flow velocity of about 0.45 cm/s, at a constant flow resistance, against the adsorptive filtering material while determining the area-based breakthrough quantity after 16 hours (80% relative humidity, 32° C., 10·1 µl HD/12.56 cm², or 12·1 µl GD/12.56 cm²).

The inventive adsorptive filter material is found to permit mustard gas permeation of only 1.11 µg/cm² or 1.91 µg/cm² and soman gas permeation of only 1.91 µg/cm² or 1.75 µg/cm², whereas the values found for the comparative adsorptive filter material are distinctly higher, above 5 µg/cm² for both mustard gas and soman, and thus are not acceptable.

Tests on the inventive adsorptive filtering material with regard to its protective effect against microorganisms likewise gave excellent results. In tests for checking the biostatic properties to ASTM E2149-01 with *Klebsiella pneumoniae* and *Staphylococcus aureus* (each at 1.5–3.0×10⁵ CFU/ml) the percentage reduction with regard to these pathogens after 24 hours was in both cases above 99% for the inventive adsorptive filter material, whereas the comparative material achieved only 63% and 71%, respectively. This shows that the biological protective function of the inventive adsorptive filtering material is improved as well.

The above tests demonstrate the improved performance capability of the inventive adsorptive filtering material comprising the catalytically active component in the supporting layer as against the comparative adsorptive filtering material wherein the catalytically active component is present in the adsorptive layer, i.e. the activated carbon is impregnated with the catalyst.

Similar results are obtained with a present invention adsorptive filtering material utilizing silver or silver oxide instead of the copper compound.

while the preferred embodiment of the invention has been illustrated and described in the drawings and forgoing description, the same is to be considered as illustrative and not restrictive in character, it being understood that all changes and modifications that come within the spirit of the invention are desired to be protected.

The invention claimed is:

1. Adsorptive filtering material with biological and chemical protective function, the adsorptive filtering material having a multilayered construction comprising:
    a first fabric outer supporting layer;
    a second fabric outer supporting layer;
    an adsorptive layer disposed between said first and second fabric outer supporting layers;
    at least one catalytically active component; and
    wherein said at least one catalytically active component is disposed in at least one of said first and second fabric outer supporting layers, wherein said catalytically active component is selected from the group consisting of copper, silver, cadmium, platinum, palladium, rhodium, zinc, mercury, titanium, zirconium, aluminum, mixtures thereof, and ions and salts of these metals, and wherein said adsorptive layer is free of any catalytically active component.

2. The adsorptive filtering material according to claim 1, wherein the adsorptive layer is secured to at least one of the first fabric outer supporting layer and the second fabric outer supporting layer.

3. The adsorptive filtering material according to claim 1, wherein the adsorptive layer is based on activated carbon, wherein the activated carbon is present in the form of activated carbon particles and/or activated carbon fibers.

4. The adsorptive filtering material according to claim 1, wherein the adsorptive layer comprises discrete particles of activated carbon in granule form or spherical form.

5. The adsorptive filtering material according to claim 1, wherein the adsorptive layer comprises activated carbon fibers in the form of an activated carbon fabric.

6. The adsorptive filtering material according to claim 1, wherein the adsorptive filtering material further comprises at least one top layer disposed on that side of the first or second fabric outer supporting layer which is remote from the adsorptive layer.

7. The adsorptive filtering material according to claim 6, wherein the top layer is provided with an oleophobicizing and/or hydrophobicizing impregnation.

8. The adsorptive filtering material according to claim 1, wherein the catalytically active component has a biostatic or biocidal effect.

9. The adsorptive filtering material according to claim 8, wherein the catalytically active component has a bacteriostatic, bactericidal, virustatic, virucidal, fungistatic and/or fungicidal effect.

10. The adsorptive filtering material according to claim 1, wherein the catalytically active component is selected from the group consisting of Ag, $Ag_2O$, Cu, $Cu_2O$, CuO and mixtures thereof.

11. The adsorptive filtering material according to claim 1, wherein the amount of catalytically active component, based on the first and/or second outer supporting layer, is in the range from of 0.001% to 20% by weight.

12. The adsorptive filtering material according to claim 1, wherein the amount of catalytically active component, based on the adsorptive filtering material, is in the range of from 0.0001% to 10% by weight.

13. The adsorptive filtering material according to claim 1, wherein the catalytically active component is comprised by the fibers, threads, yarns or filaments forming the textile fabric.

14. The adsorptive filtering material according to claim 1, wherein the catalytically active component is comprised by the fibers, threads, yarns or filaments forming the textile fabric, the incorporation of the catalytically active component having been realized by spinning, extrusion, impregnation, chemical or plasma-chemical treating processes.

15. The adsorptive filtering material according to claim 1, wherein the adsorptive filtering material is gas-pervious and water-pervious and water-vapor-pervious and wherein the adsorptive filtering material has an overall basis weight in the range from 150 to 1000 $g/m^2$.

16. Protective clothing comprising an adsorptive filtering material according to claim 1.

17. The protective clothing according to claim 16, said protective clothing being selected from the group consisting of materials of garments for the civil or military sector, protective suits, protective gloves, protective shoewear, protective socks, protective headgear, protective covers and blankets.

18. Filtering material comprising an adsorptive filtering material according to claim 1.

19. The filtering material of claim 18, said filtering material being selected from the group consisting of filtering materials for removing noxiant, odorant and toxicant materials of any kind, air-filters, gas-filters, NBC protective mask filters, odor filters, sheet filters, air-filters for indoor air-cleaning, adsorption-capable supporting structures and filters for the medical sector.

20. Adsorptive filtering material with biological and chemical protective function, the adsorptive filtering material having a multilayered construction comprising:
   a first fabric outer supporting layer;
   a second fabric outer supporting layer;
   an adsorptive layer disposed between said first and second fabric outer supporting layers;
   at least one catalytically active component; and
   wherein said at least one catalytically active component is disposed in at least one of said first and second fabric outer supporting layers, wherein the first and second fabric outer supporting layers are composed of manufactured fibers selected from the group consisting of polyamides, polyesters, polyolefins, polyurethanes, polyvinyl and polyacrylics, and wherein said absorptive layer is free of any catalytically active components.

21. The adsorptive filtering material of claim 20, wherein said at least one catalytically active component has a biostatic or biocidal effect and is based on a metal or a metal compound selected from the group consisting of copper, silver, mixtures thereof, and ions and salts of these metals.

22. The adsorptive filtering material of claim 21, wherein said catalytically active component is permanently incorporated into said manufactured fibers forming the first and/or second fabric outer supporting layers by a process selected from the group consisting of spinning, extrusion, chemical treatment and plasma-chemical treatment.

* * * * *